UNITED STATES PATENT OFFICE.

WILLIAM B. GERE, OF SYRACUSE, NEW YORK, ASSIGNOR TO THE MERRELL-SOULE COMPANY, OF SAME PLACE.

SOUP-POWDER AND METHOD OF MAKING SAME.

SPECIFICATION forming part of Letters Patent No. 625,880, dated May 30, 1899.

Application filed May 20, 1898. Serial No. 681,186. (No specimens.)

*To all whom it may concern:*

Be it known that I, WILLIAM B. GERE, a citizen of the United States, residing at Syracuse, in the county of Onondaga and State of New York, have invented new and useful Improvements in Soup-Powders, of which the following is a specification.

This invention has for its object to place soups containing vegetables and the soluble ingredients of meat upon the market in the form of a dry powder or meal containing said ingredients in a cooked condition ready for use, so that soup can be prepared for consumption in a few minutes by simply adding a proper amount of water or other liquid to the powder and heating the mixture.

Various kinds of vegetables and vegetable produce can be employed. For the purpose of explaining the invention I will describe in detail the preparation of soup-powders from some of the vegetables which are most commonly used in the preparation of soups.

Soup-stock containing the soluble ingredients of meat, preferably of beef from which the fat has been removed, is prepared by boiling to a jelly-like consistence in the usual manner.

In preparing tomato-soup powder according to my invention ripe tomatoes well washed are cooked, steamed, or stewed preferably until they are reduced to about one-half the original volume. The skins and seeds are then removed by straining the cooked mass in the manner usually practiced in making catsup. Starch, flour, or gluten, or some other starchy or glutinous substance is added to the strained pulp in about the proportion of from five to ten per cent. of the weight of the raw tomatoes. The soup-stock is also added in about the proportion of from five to ten per cent. of the raw tomatoes. These ingredients are thoroughly mixed and form a moist pulpy mixture which is then thoroughly dried, preferably on a drying-machine of well-known construction comprising one or more rotating hollow cylinders heated by steam, upon the outer surface of which the mixture is dried. The dried material is removed from the cylinder by a scraper in the form of thin sheets or flakes more or less broken up and pulverized and is further reduced to a powder or meal, if necessary, in a tumbling-machine of ordinary construction or by other means and is then bolted or sifted. The starch which is added to the moist cooked pulp and the soup-stock absorbs moisture therefrom, whereby the starch-cells are swelled and thoroughly incorporated with the other ingredients. During the subsequent drying the heat expels the moisture from the starch-cells and causes the same to burst, leaving the starch in the most effective condition for absorbing the moisture quickly and communicating it to the vegetable substance and soup-stock. The product is a dry powder or meal in which the starch is thoroughly combined with the cooked vegetable pulp and soup-stock and which absorbs moisture at once. In using this powder in the preparation of soup it is mixed with water or milk or milk and water in any desired proportion, two and one-half ounces of the powder being ordinarily sufficient for admixture with one quart of liquid. The mixture is then heated, preferably to the boiling-point, when it is ready for use, forming a rich soup of excellent flavor.

In canning tomatoes a large amount of the liquid constituents of the tomato is wasted because too thin for canning. This liquid can be added to the tomatoes before cooking or stewing the same and can so be utilized.

In preparing celery-soup powder the celery is picked apart, washed, and freed from the green leaves and roots. It is then cut into short pieces and boiled, cooked, or steamed in an open kettle for about thirty-five minutes or under steam-pressure for a correspondingly shorter time. The boiled celery is then reduced to a pulpy condition by grinding or crushing. The starchy or glutinous material and the soup-stock are then added, each of these ingredients preferably in about the proportion of from ten to fifteen per cent. of the weight of the raw celery. The mixture is then dried, reduced to powder or meal, and bolted or sifted, as above described. Celeriac and asparagus can be treated in substantially the same way.

In preparing corn-soup powder the green corn is cut from the cob as in preparing the corn for canning. The corn is then boiled, cooked, or steamed and reduced to a pulp by grinding or crushing. Starch or analogous material is then added, preferably in about the proportion of from four to six per cent. of the weight of the green corn removed from the cob, and soup-stock is added in about the proportion of from five to ten per cent. of the weight of the green corn. The mixture is then dried, ground, or crushed and bolted or sifted, as above described. The skins need not be removed before drying the mixture, because they are tough and coarse and are readily separated in the final bolting or sifting.

The vegetable ingredients of these soup-powders possess a fine natural flavor and require no further cooking. The soup-stock is composed of soluble ingredients only and contains substantially no fibrous and fatty matters. The starch which is combined with the cooked vegetable ingredients and soup-stock facilitates the incorporation of the ingredients with the liquid to a creamy palatable soup. The latter is made ready for consumption by simply mixing the powder with the necessary liquid and heating to the desired temperature. Soup can therefore be prepared from these powders in a few minutes, and the powders are easily preserved without deterioration until wanted for use.

If desired, the soup-stock and the vegetable can be separately mixed with starch and dried. In proceeding in this manner I mix with the soup-stock starch or analogous material in about the proportion of from five to seven per cent. of the weight of the soup-stock, depending somewhat upon the consistency of the soup-stock, and dry and pulverize the mixture as described, and I cook, steam, or stew the vegetable and mix with it starch or analogous material in about the proportion of from five to fifteen per cent. of the weight of the raw vegetable and dry and pulverize the mixture, as described. The soup-stock powder and the vegetable powder are then mixed in any suitable proportion, preferably in about the proportion of from five to fifteen parts of vegetable powder to one part of soup-stock powder.

I claim as my invention—

1. The herein-described method of preparing vegetable-soup powder or meal which consists in cooking the green vegetable substance and reducing the same to a pulp, adding starch and soup-stock composed of the soluble ingredients of meat to the pulp, and drying the mixture of pulp, starch and soup-stock, substantially as set forth.

2. The herein-described soup powder or meal consisting of cooked vegetable matter combined with starch and soup-stock composed of the soluble ingredients of meat, substantially as set forth.

Witness my hand this 16th day of May, 1898.

WILLIAM B. GERE.

Witnesses:
EDWARD WILHELM,
M. D. CLARK.